United States Patent
Lorenz

(10) Patent No.: US 12,188,524 B2
(45) Date of Patent: Jan. 7, 2025

(54) PRESSURE-ACTUATED CLUTCH WITH A DOUBLE PISTON, AND TORQUE DISTRIBUTION DEVICE FOR A MOTOR VEHICLE WITH TWO CLUTCHES OF THIS TYPE

(71) Applicant: Schaeffler Technologies AG & Co. KG, Herzogenaurach (DE)

(72) Inventor: Elmar Lorenz, Rheinmünster Söllingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/691,209

(22) PCT Filed: Sep. 14, 2022

(86) PCT No.: PCT/DE2022/100680
§ 371 (c)(1),
(2) Date: Mar. 12, 2024

(87) PCT Pub. No.: WO2023/057005
PCT Pub. Date: Apr. 13, 2023

(65) Prior Publication Data
US 2024/0392841 A1    Nov. 28, 2024

(30) Foreign Application Priority Data
Oct. 8, 2021    (DE) ..................... 10 2021 126 107.4

(51) Int. Cl.
*F16D 25/0638*    (2006.01)
*F16D 25/10*    (2006.01)

(52) U.S. Cl.
CPC ......... *F16D 25/0638* (2013.01); *F16D 25/10* (2013.01)

(58) Field of Classification Search
CPC ....... F16D 13/52; F16D 25/0638; F16D 13/70
See application file for complete search history.

(56) References Cited

U.S. PATENT DOCUMENTS 3,262,531 A     7/1966    Black et al.
3,690,429 A  *  9/1972    Honda ................ F16D 25/0638
                                                    192/85.29
(Continued)

FOREIGN PATENT DOCUMENTS

DE    102009050998 A1       5/2011
DE    102018130326 A1  *    3/2020
(Continued)

*Primary Examiner* — Stacey A Fluhart

(57) ABSTRACT

A clutch device for a motor vehicle includes a disc pack and an actuation device. The disc pack includes an outer disc pack and an inner disc pack arranged. The actuation device includes a retaining element, a primary piston, a secondary piston and a spring element. The primary piston and the secondary piston are each arranged on the retaining element in an axially displaceable manner and delimit respective pressure chambers. The spring element is integrally formed with the secondary piston and connects the primary and secondary pistons. When a pressure is applied to a pressure medium in the primary pressure chamber, the primary piston is arranged to move the outer disc pack against the inner disc pack and frictionally transmit torque. When a pressure is applied to a pressure medium in the secondary pressure chamber, the secondary piston is arranged to move the primary piston against the outer disc pack.

17 Claims, 2 Drawing Sheets

(56) References Cited

U.S. PATENT DOCUMENTS

| | | | | |
|---|---|---|---|---|
| 4,623,055 | A * | 11/1986 | Ohkubo | F16D 25/0638 |
| | | | | 192/52.4 |
| 5,950,787 | A * | 9/1999 | Murasugi | F16H 63/3026 |
| | | | | 192/85.25 |
| 6,708,808 | B1 * | 3/2004 | Andres | F16D 25/0638 |
| | | | | 192/85.05 |
| 10,563,707 | B2 | 2/2020 | Park | |
| 2005/0284724 | A1 | 12/2005 | Hagenow | |
| 2008/0314711 | A1 * | 12/2008 | Jayaram | F16H 63/3023 |
| | | | | 192/85.29 |
| 2013/0075222 | A1 * | 3/2013 | Ari | F16D 25/12 |
| | | | | 137/511 |
| 2013/0161146 | A1 * | 6/2013 | Hemphill | F16D 25/0638 |
| | | | | 192/85.17 |
| 2015/0247537 | A1 | 9/2015 | Park | |
| 2017/0241487 | A1 * | 8/2017 | Sasahara | F16D 13/52 |

FOREIGN PATENT DOCUMENTS

| | | | | |
|---|---|---|---|---|
| DE | 102018130331 | A1 | | 3/2020 |
| DE | 102021117891 | B3 | | 8/2022 |
| DE | 102021117892 | A1 | | 1/2023 |
| DE | 102021126114 | A1 | | 4/2023 |
| JP | H05001031 | U | | 1/1993 |
| JP | 2010255841 | A * | 11/2010 | F16D 25/02 |
| JP | 2017180730 | A | | 10/2017 |

* cited by examiner

PRESSURE-ACTUATED CLUTCH WITH A DOUBLE PISTON, AND TORQUE DISTRIBUTION DEVICE FOR A MOTOR VEHICLE WITH TWO CLUTCHES OF THIS TYPE

CROSS-REFERENCE TO RELATED APPLICATIONS

This application is the United States National Phase of PCT Appln. No. PCT/DE2022/100680 filed Sep. 14, 2022, which claims priority to German Application No. DE102021126107.4 filed Oct. 8, 2021, the entire disclosures of which are incorporated by reference herein.

TECHNICAL FIELD

The present disclosure relates to a clutch device for a motor vehicle

BACKGROUND

U.S. Pat. No. 10,563,707 B2 discloses a torque distribution device with a clutch device having a first and a second pressure piston, wherein the second pressure piston runs against the disc pack and the first pressure piston runs against the second pressure piston, and the pistons are in direct contact with one another. Such a system is also referred to as a "tandem arrangement". Here, the two individual forces of the pressure pistons are added together, and the pressure chambers associated with the pressure pistons in each case are pressurized together.

The outer disc pack and the inner disc pack, which engage with one another, can be actively compressed by means of the actuation device and can also be released again. The discs can be brought into a frictional connection, in particular a frictional engagement, by means of the actuation device in order to transmit the torque. This state is also referred to as the sensed state. In order to compress the disc packs, the actuation device includes a primary piston with which a primary pressure chamber is associated. A hydraulic pressure medium can be pressed into the primary pressure chamber so that an axial displacement of the primary piston, which causes the compression of the disc pack, is controlled. The respective clutch is opened or, in other words, released by relieving the pressure so that the frictional connection or frictional engagement is canceled.

SUMMARY

The present disclosure provides a clutch device of the type mentioned at the outset, having a primary piston and a secondary piston that are connected to one another via a spring element. The secondary piston and the spring element are an integral component.

The spring element provides for a low-hysteresis control behavior of the clutch device. As such, the application of pressure to the pressure medium provided in the primary pressure chamber causes the primary piston to press against the disc pack, specifically against an elastic restoring force of the spring element connected to the primary piston, which in turn is connected to the secondary piston. If the frictional engagement caused by this is to be canceled, it is sufficient to reduce the pressure in the primary pressure chamber, for example by opening a corresponding valve. The spring element, which is still tensioned at this moment, causes the primary piston to move away from the disc pack without any time delay. In this context, the term "hysteresis-free" means that when a corresponding control signal is present to reduce the primary chamber pressure, which causes the valve to open, for example, the friction between the disc packs is eliminated immediately and without delay.

According to the disclosure, it is further provided that the secondary piston and the spring element are an integral component. Consequently, the benefits associated with the spring element are achieved in the clutch device according to the disclosure without increasing the complexity, e.g., with regard to the number of individual components of the clutch device, and the associated manufacturing effort. Specifically, the integral nature of these components simplifies the manufacturing process of the clutch device according to the disclosure, as the secondary piston and the spring element can be manufactured and assembled together, thus eliminating extra work steps. For example, it is conceivable that the integral component is manufactured by deep-drawing a sheet metal component. In addition, the integral design means that no separate connecting and possibly sealing means are required to fasten the spring element to the secondary piston, e.g., in a fluid-tight manner. In addition, forces are transmitted from the secondary piston via the spring element to the primary piston during operation of the clutch device in the course of overcoming the release clearance with virtually no loss, as no losses due to the otherwise required connecting means occur in this case.

In order to seal the primary pressure chamber and the secondary pressure chamber with respect to the axial movement of the primary piston and the secondary piston along the retaining element, the pistons can each slide on a sealing element, e.g., a stationary sealing element arranged on the retaining element, which can be a sealing ring.

In an example embodiment of the present disclosure, the spring element is a bellows. A bellows is an elastic element that can be folded in an accordion-like manner and that can extend radially around the entire circumference with respect to an axis of rotation of the clutch device, so that a uniform force effect is realized by means of the bellows. In relation to the axial direction, the bellows may have a repeating cross-sectional structure, which can be U-shaped and/or Ω-shaped at least in sections. The restoring force that can be achieved by means of the bellows or the spring hardness of the spring element depends, for example, on the wall thickness of the bellows material. The bellows may be made of a metal that has good mechanical properties, such as elasticity and durability. According to the disclosure, the bellows and the secondary piston are formed integrally, for example from a single piece of sheet metal which is folded in an accordion-like manner in the region of the bellows. Alternatively, the bellows can be connected to the secondary piston in a materially bonding manner, for example by means of a welded connection.

If the spring element is a bellows, the spring element may delimit the primary pressure chamber outwards in the radial direction. In this embodiment, the bellows is fluid-tight, and a corresponding fluid-tightness is also provided virtually automatically at the corresponding transition point due to the integral nature of the spring element and the secondary piston. The bellows is further fastened to the primary piston via a fluid-tight connection so that, on the one hand, the fluid volume is sealed and, on the other hand, the bellows can also exert a tensile force on the primary piston for release when the pressure is relieved. In this embodiment, the bellows thus not only performs the function described above with regard to the restoring effect, but also serves to seal or delimit the primary pressure chamber.

Alternatively, the spring element can also be a coil spring or a disc spring. These springs can also be made of metal and, for example, in the case of the disc spring, can be formed integrally, for example from the sheet metal with the secondary piston, or be welded on.

In the clutch device according to the disclosure, the secondary piston can have a radial secondary piston section and an adjoining axial secondary piston section. The secondary piston is practically L-shaped when viewed in cross-section. The axial secondary piston section extends in a cylindrical shape and the radial secondary piston section extends in a disc-like shape, and the radial secondary piston section is arranged at a front end of the cylindrical axial secondary piston section. The secondary piston is thus closed, for example, at the end at which the radial secondary piston section is arranged, and open at the opposite end. This open end of the secondary piston points in the direction of the primary piston and is fastened thereto. The radial secondary piston section serves to form a support surface for a further spring element and a stop surface for the secondary piston running against a support flange, which is discussed in detail further below.

The spring element, e.g., the bellows, may be arranged at the end of the axial secondary piston section opposite the radial secondary piston section. In this embodiment, the spring element forms a virtually annular disc-shaped axial end section of the axial secondary piston section, which sits on the primary piston and is fastened thereto. If the spring element is the bellows, this creates a comparatively large contact surface between the spring element and the primary piston, which is advantageous in terms of force transmission and, for example, fluid-tightness. Alternatively, the spring element can form the entire axial secondary piston section. In this embodiment, the spring element, e.g., the bellows, directly adjoins the radial secondary piston section.

The clutch device according to the disclosure can have the support flange extending from the retaining element, e.g., in the radial direction, which extends between the primary piston and the secondary pistons, the support flange may delimit the primary pressure chamber, e.g., on the side of the primary pressure chamber opposite the primary piston. The cylindrical axial secondary piston section can engage around the support flange in such a way that the axial secondary piston section slides and is guided along the radial end of the support flange. In addition to the pure support function, a support flange sealing element can further be provided, which is arranged at a radial end of the support flange and which seals towards the axial secondary piston section in a fluid-tight manner, e.g., in order to seal the primary pressure chamber. The support flange sealing element can be a sealing ring arranged radially on the outside of the support flange, e.g., made of an elastomer. In this case, the primary pressure chamber is delimited by the primary piston, the axial secondary piston section, e.g., the spring element, and the support flange.

The beneficial effect of the spring element mentioned at the outset regarding the hysteresis-free control behavior of the clutch device according to the disclosure can be realized by an axial running of the radial secondary piston section onto the support flange. Thus, when the clutch device is transferred from the release position to the sensing position, the secondary piston, specifically the disc-like radial secondary piston section, can reach a stop position in which it runs onto the support flange, and the primary piston is pressed even further against the disc pack and against the restoring force of the spring element coupled thereto when the pressure in the primary pressure chamber increases further, which occurs against the restoring force of the spring element. In this embodiment, the required counterforce is provided by means of the support flange.

In an example embodiment of the clutch device according to the disclosure, the secondary pressure chamber is delimited by a secondary pressure chamber delimiting flange which is stationary with respect to the axially displaceable secondary piston and is fastened to the retaining element. The radial secondary piston section has an axially open annular groove delimiting the secondary pressure chamber, and the secondary pressure chamber delimiting flange engages axially in the annular groove and slides in a fluid-tight manner along a surface of the annular groove with a delimiting flange sealing element during the axial displacement of the secondary piston. The annular groove forms a central recess, as viewed radially, of the disc-shaped radial secondary piston section, and the secondary pressure chamber delimiting flange engages in the annular groove and slides along it in order to guide the axial movement of the secondary piston. The outer diameter of the axially open annular groove thus corresponds approximately to the outer diameter of the secondary pressure chamber delimiting flange. The secondary pressure chamber delimiting flange, which may be L-shaped in cross-section, can have a radial section that extends away from the retaining element in the radial direction in a disc-like manner. An axial section can be arranged on the radial section, via which the secondary pressure chamber delimiting flange engages in a cylinder-like manner in the axially open cylinder-like annular groove.

In this embodiment, the secondary pressure chamber can be delimited at one axial end by the annular groove of the secondary piston and at the other axial end by the secondary pressure chamber delimiting flange. With regard to the radial direction, the secondary pressure chamber is delimited both by an axial wall section of the annular groove and by the axial section of the secondary pressure chamber delimiting flange.

A delimiting flange sealing element can be provided on the secondary pressure chamber delimiting flange, e.g., at the open end of the axial section, which is accommodated in the annular groove and which seals the secondary pressure chamber to the outside in a fluid-tight manner. The delimiting flange sealing element can protrude radially beyond the secondary pressure chamber delimiting flange so that the required sealing effect is reliably achieved. The delimiting flange sealing element can be a sealing ring, e.g., made of an elastomer.

The secondary pressure chamber delimiting flange can additionally or alternatively be fastened to a rotor carrier of a torque distribution device, which is discussed in detail further below:

In the clutch device according to the disclosure, a further spring element can be provided, which is supported on the one hand on a section which is stationary with respect to the axially displaceable pistons, e.g., the or a support flange, and on the other hand on the secondary piston. The further spring element can, for example, be a bellows or a coil spring or disc spring, and the longitudinal axis of the further spring element coincides with the longitudinal axis of the clutch device. When pressure is applied to the secondary pressure chamber, the secondary piston is displaced against an elastic restoring force of the further spring element so that it automatically moves the secondary piston away from the primary piston when the pressure in the secondary pressure chamber drops. When the clutch device is transferred from the sensing position to the release position, the further spring element consequently causes the secondary piston to move away from the primary piston immediately when the pressure application to the secondary pressure chamber ceases and relieves the pressure on the primary piston and, since the primary piston and the secondary piston are connected to one another, causes the primary piston to move away from the disc pack. The hysteresis-free control behavior of the clutch device already mentioned above is therefore further enhanced by the further spring element.

In order to distribute the pressure medium into the pressure chambers, a pressure medium distribution unit connected to a pressure medium supply line can be provided, which is part of the retaining element and/or is arranged thereon. In this regard, a separate pressure medium supply line can be provided for each pressure chamber. The pressure medium distribution unit can have at least one valve that can be controlled by means of a control device, so that the pressure application and pressure reduction in the pressure chambers can be individually controlled accordingly.

The present disclosure further relates to a torque distribution device for a motor vehicle, having two clutch devices each designed as multiple disc clutches according to the preceding description and a rotor carrier that is or can be coupled to the input shaft. The outer disc pack of each of the clutch devices is arranged in an axially displaceable manner on the rotor carrier in each case, the inner disc pack of each of the clutch devices is arranged in an axially displaceable manner on a separate inner multiple disc carrier in each case, and each inner multiple disc carrier is or can be coupled to a separate output shaft. The clutch devices of the torque distribution device can be configured as mirrored. All advantages, features and aspects described in connection with the clutch device according to the disclosure are applicable to the torque distribution device and vice versa.

BRIEF DESCRIPTION OF THE DRAWINGS

The present disclosure is explained below on the basis of exemplary embodiments with reference to the drawings. The drawings are schematic representations, in which.

DETAILED DESCRIPTION

Figure 1:
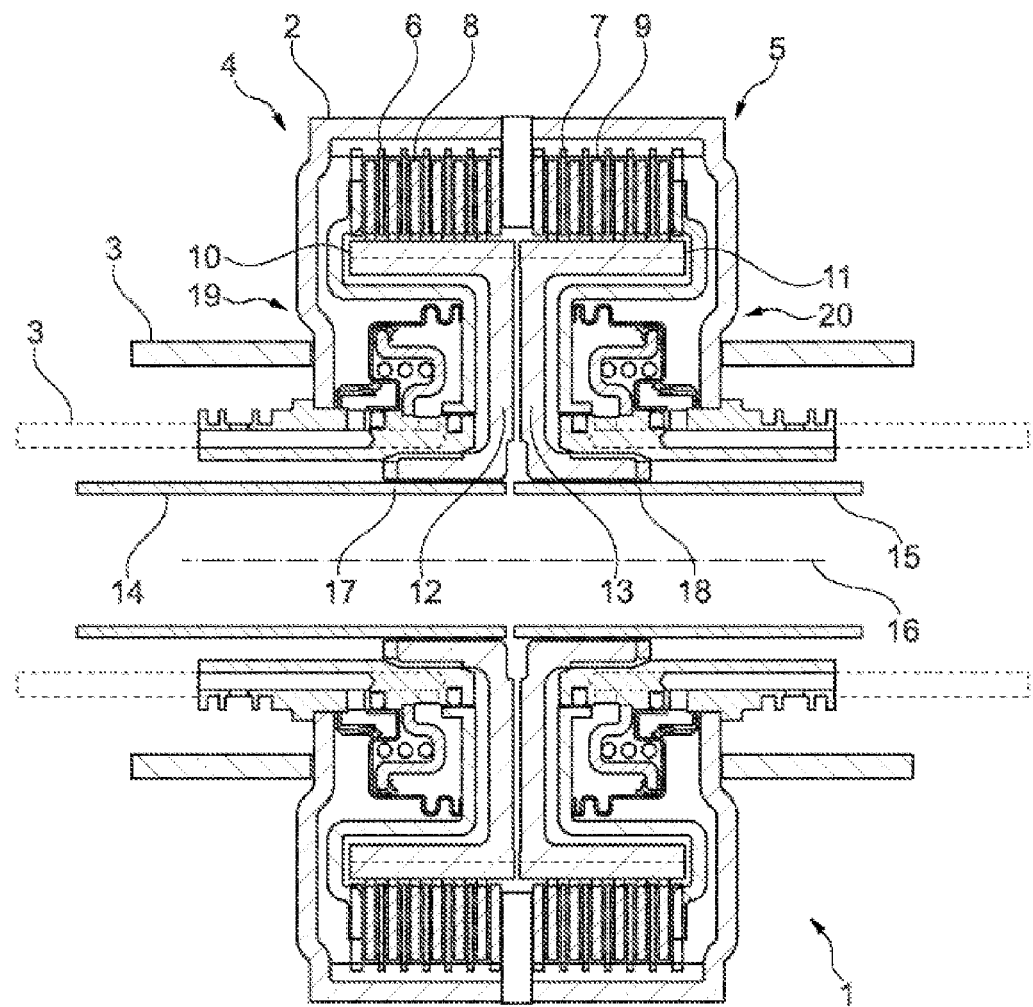
FIG. 1 shows a longitudinal section through an exemplary embodiment of a torque distribution device according to the disclosure having two clutch devices according to the disclosure.
Figure 2:
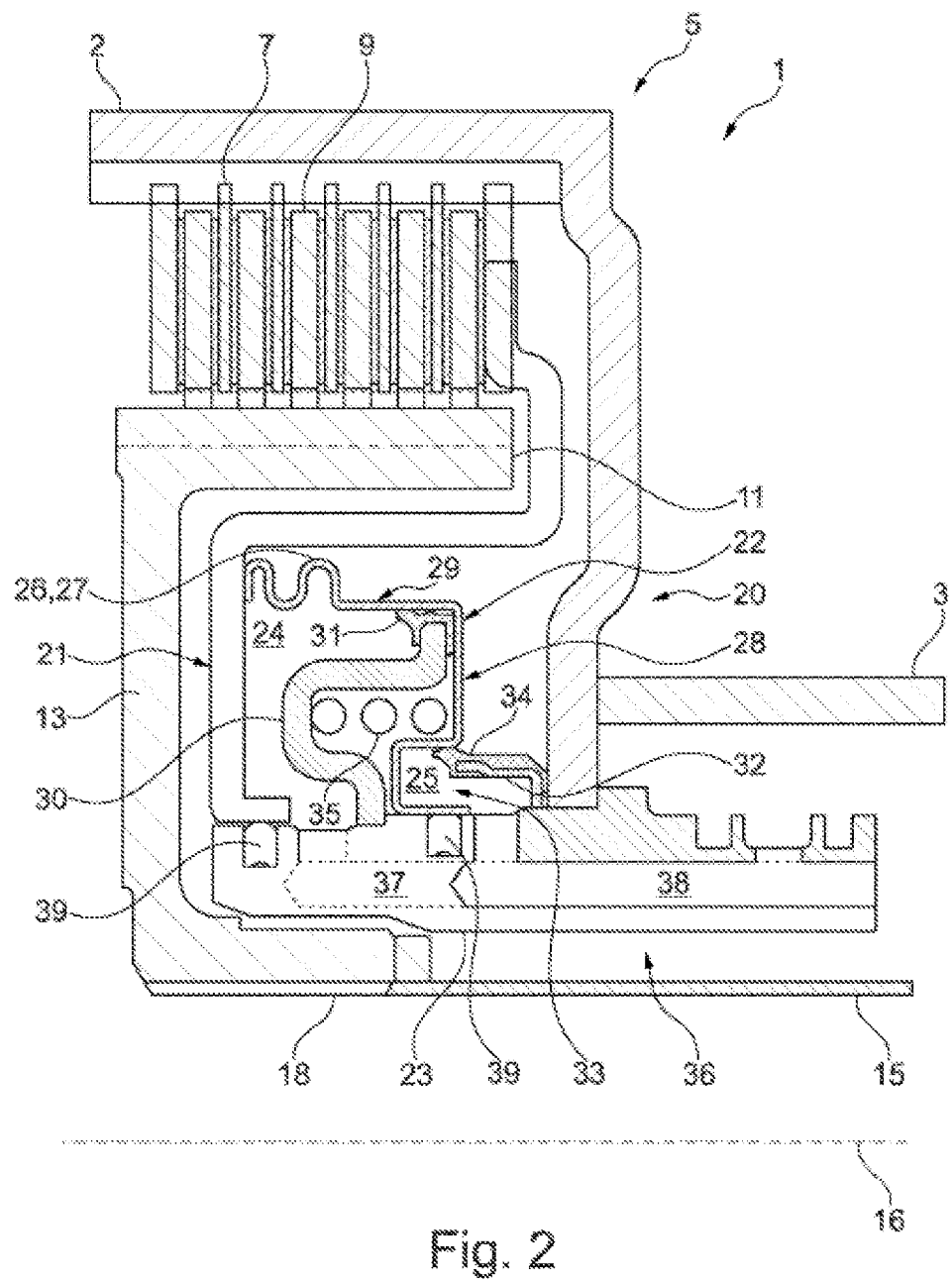
FIG. 2 shows an enlarged view of the upper right part of the torque distribution device from FIG. 1.

FIG. 1 shows a longitudinal section running along an axial direction through an exemplary embodiment of a torque distribution device 1 according to the disclosure in a schematic representation. FIG. 2 is an enlarged view of the upper right quarter of FIG. 1. The torque distribution device 1 is part of a motor vehicle not shown in detail and is used to transmit the drive torque generated by a motor to the two wheels of a common axle according to an adjustable ratio.

The torque distribution device 1 includes a rotor carrier 2 that is U-shaped as viewed in a longitudinal section, which, like almost all components of the torque distribution device 1, is designed to be ring-shaped. The rotor carrier 2 is connected or can be connected to a torque-introducing shaft 3 or input shaft, for example by means of a welded connection. As indicated by the dashed line in FIG. 1, the shaft 3 can also be provided at other points on the torque distribution device 1. In any case, the shaft 3 is coupled to the rotor carrier 2 so that the introduced torque is transmitted to the rotor carrier 2. The rotor carrier 2 and the shaft 3 are rotatably mounted about a rotation axis 16.

The torque distribution device 1 also includes two separate clutch devices 4, 5 according to the disclosure, which are designed as multiple disc clutches. Each clutch device 4, 5 includes an axially displaceable outer disc pack 6, 7, which is connected in a non-rotatable manner to the rotor carrier 2 via a toothing connection. Each clutch device 4, 5 includes an axially displaceable inner disc pack 8, 9, each of which is coupled in a non-rotatable manner to an inner multiple disc carrier 10, 11 via a toothing connection and can be coupled or is coupled to a separate output shaft 14, 15 via a hub flange 12, 13. For this purpose, each hub flange 12, 13 has an axial toothing 17, 18 which meshes with an axially extending outer toothing of the output shafts 14, 15. The output shafts 14, 15, as well as the rotor carrier 2 together with the shaft 3, are rotatable about the rotation axis 16. The outer and inner disc packs 6, 8 and 7, 9 each engage in one another and each form a common disc pack.

The clutch devices 4, 5 each include a separate actuation device 19, 20, via which the respective clutch device 4, 5 can be actuated. The clutch devices 4, 5 or actuation devices 19, 20 can be controlled separately so that the torque introduced by means of the shaft 3 can be selectively guided from the rotor carrier 2 to the output shafts 14, 15.

In the following, details regarding the actuation device 20 are explained with reference to FIG. 2, in which the corresponding section of the torque distribution device 1 is shown enlarged. However, the aspects explained in this context apply equally to the mirrored actuation device 19 or clutch device 4.

The clutch device 5 or actuation device 20 includes a primary piston 21 and a secondary piston 22. A stationary retaining element 23 is provided on the rotor carrier 2, on which the pistons 21, 22 are arranged in an axially displaceable manner. The primary piston 21 rests with its radially outer end against the outer disc pack 7 or faces it, so that the outer disc pack 7 can be pressed axially against the inner disc pack 9 by means of the primary piston 21 in order to bring the disc packs 7, 9 into frictional contact or frictional engagement. The primary piston 21 has an annular groove-like section located radially on the inside, in which further components of the actuation device 20 or clutch device 5, which are discussed in detail further below; are accommodated in a space-saving design for the clutch device 5.

A wall or section of the primary piston 21 delimits a primary pressure chamber 24. A pressure medium such as a hydraulic oil can be introduced into the primary pressure chamber 24 and pressurized, so that when pressure is applied to the pressure medium, the axial displacement previously described and thus the pressure effect of the primary piston 21 on the disc packs 7, 9 is effected.

The secondary piston 22 delimits a secondary pressure chamber 25, into which a pressure medium such as a hydraulic oil can also be introduced and pressurized. The primary piston 21 and the secondary piston 22 are coupled to one another via a spring element 26, which in the present case is a bellows 27. Here, the secondary piston 22 and the spring element 26 are an integral component. By way of example, the integral component is a correspondingly formed, integral sheet metal part which forms both the bellows 27 and the secondary piston 22. The practically cylindrical or ring-shaped bellows 27 delimits the primary pressure chamber 24 outwards in the radial direction. The bellows 27 is correspondingly designed to be fluid-tight and is fastened to the primary piston 21 by means of a fluid-tight connection. The bellows 27 is fastened to the primary piston 21, so that when the secondary piston 22 moves in a direction away from the primary piston 21, the primary piston 21 can also move the secondary piston away from the disc pack.

In order to seal the primary pressure chamber 24 and the secondary pressure chamber 25 with respect to the axial movement of the primary piston 21 and the secondary piston 22 along the retaining element 23, the pistons 21, 22 each slide on a sealing element 39 arranged on the retaining element 23, which is in each case designed as a sealing ring.

The secondary piston 22 includes a radial, disc-like secondary piston section 28 and an axial, cylinder-like secondary piston section 29 adjoining it, wherein the bellows 27 is a component of the axial secondary piston section 29. Viewed in cross-section, the secondary piston 22 is L-shaped due to the sections 28, 29. The bellows is arranged at the end of the axial secondary piston section 29 opposite the radial secondary piston section 28. Alternatively, the spring element 26 or the bellows 27 can form the axial secondary piston section 29.

The retaining element 23 has a support flange 30 extending in the radial direction, which extends between the primary piston 21 and the secondary piston 22. The support flange 30 is engaged around by the cylindrical axial secondary piston section 29, so that the axial secondary piston section 29 slides along the radial end of the support flange 30. A support flange sealing element 31, in the present case a sealing ring made of an elastomer mounted on the support flange, is arranged at the radial end of the support flange 30 for fluid-tight sealing of the primary pressure chamber 24 towards the secondary piston 22 or the secondary piston section 29.

The secondary pressure chamber is delimited by a secondary pressure chamber delimiting flange 32, which is L-shaped in cross-section and which is stationary with respect to the axially displaceable pistons 21, 22 as well as fastened to the retaining element 23. The radial secondary piston section 28 has an axially open annular groove 33 delimiting the secondary pressure chamber 25, into which the secondary pressure chamber delimiting flange 32 axially engages. During the axial displacement of the secondary piston 22, the secondary pressure chamber delimiting flange 32 slides along a surface of the annular groove 33. A delimiting flange sealing element 34 is provided in order to seal the secondary pressure chamber 25, which rests against the secondary piston in the annular groove 33. The delimiting flange sealing element 34 is also a sealing ring made of an elastomer.

As can be seen in particular from FIG. 2, the secondary pressure chamber delimiting flange 32 has a radial section in which it extends in a disc-like manner away from the retaining element 23 in the radial direction. The radial section is followed by a cylindrical axial section, via which the secondary pressure chamber delimiting flange 32 engages in the cylinder-like annular groove 33, which is also delimited radially outwards. The secondary pressure chamber 25 is delimited at one axial end by the annular groove 33 of the secondary piston 22 and at the other axial end by the secondary pressure chamber delimiting flange 32. With regard to the radial direction, the secondary pressure chamber 25 is delimited both by an axial wall section of the annular groove 33 and by the axial section of the secondary pressure chamber delimiting flange 32.

In the clutch device 5, a further spring element 35 is also provided, which is supported on the one hand on the support flange 30 and on the other hand on the secondary piston 22, specifically on the radial secondary piston section 28 adjacent to the annular groove 33. In the present case, the further spring element 35 is a coil spring that extends around the rotation axis 16 with respect to its circumference.

In order to distribute the pressure medium into the pressure chambers 24, 25, a pressure medium distribution unit 36 is provided, which is partially arranged within or in the region of the retaining element 23. The pressure medium distribution unit 36 includes a primary pressure medium supply line 37, by means of which the primary pressure chamber 24 can be supplied with pressure medium. Furthermore, the pressure medium distribution unit 36 includes a secondary pressure medium supply line 38, by means of which the secondary pressure chamber 25 can be supplied with pressure medium. The pressure medium distribution unit 36 includes valves, which are not shown in detail and can be controlled by means of a control device, so that the pressure chambers 22, 23 can be pressurized. The supply lines 37, 38 can be supplied with pressure medium independently of one another and, as a result, the pressure chambers 37, 38 can also be pressurized independently of one another.

The function of the torque distribution device 1 or the clutch device 5 is explained below, wherein the function of the clutch device 4 is of course the same. First, the method by means of which the clutch device 5 is transferred from a release position to a sensing position is described. The sensing position is the position in which the clutch device 5 is closed. i.e., the torque can be transmitted from the input shaft 3 to the output shaft 15, depending on which clutch device is actuated, by means of friction between the outer disc pack 7 and the inner disc pack 9 caused by the pressure force of the primary piston 21. The release position is the position in which this friction is canceled by spacing apart the primary piston 21 from the disc pack.

For this purpose, it is provided that, starting from a situation in which both pressure chambers 24, 25 are not pressurized, pressure is first applied to the secondary pressure chamber 25, so that the secondary piston, with reference to FIG. 2, moves to the left and displaces the primary piston 21 to the left, so that the latter comes into contact with the outer disc pack 9. This results in a very rapid transfer of the primary piston 21 to the disc pack, so that the so-called release clearance is overcome very quickly. In this regard, the secondary piston runs against the support flange 30, which serves as an axial stop. Subsequently or simultaneously, pressure is applied to the primary pressure chamber 24, which ultimately effects the pressure force of the primary piston 21 against the disc pack in order to compress the latter. At the same time, the bellows 27 connected to the primary piston is tensioned, as the primary piston 21 moves while the secondary piston 28 is supported on the support flange 30.

The multiple disc clutch 5 is returned from the sensing position to the release position by depressurizing both pressure chambers 24, 25 with respect to the pressure medium arranged therein in each case. In this regard, the spring element 26, i.e., the bellows 27, which is subjected to tensile loading, directly causes the primary piston 21 to move away from the disc pack, so that it is immediately relieved. This effect is reinforced by the further spring element 35, which also moves the secondary piston 22 to the right with reference to FIG. 2, so that a low-hysteresis control behavior is also achieved with regard to the opening of the clutch device 5.

REFERENCE NUMERALS

1 Torque distribution device
2 Rotor carrier

3 Shaft
4 Clutch device
5 Clutch device
6 Outer disc pack
7 Outer disc pack
8 Inner disc pack
9 Inner disc pack
10 Inner multiple disc carrier
11 Inner multiple disc carrier
12 Hub flange
13 Hub flange
14 Output shaft
15 Output shaft
16 Rotation axis
17 Axial toothing
18 Axial toothing
19 Actuation device
20 Actuation device
21 Primary piston
22 Secondary piston
23 Retaining element
24 Primary pressure chamber
25 Secondary pressure chamber
26 Spring element
27 Bellows
28 Secondary piston section
29 Secondary piston section
30 Support flange
31 Support flange sealing element
32 Secondary pressure chamber delimiting flange
33 Annular groove
34 Delimiting flange sealing element
35 Spring element
36 Pressure medium distribution unit
37 Primary pressure medium supply line
38 Secondary pressure medium supply line

The invention claimed is:

1. A clutch device for a motor vehicle, comprising an outer disc pack that is or can be coupled to an input shaft, an inner disc pack that is or can be coupled to an output shaft, which forms a disc pack with the outer disc pack, and an actuation device having a retaining element, on which a primary piston and a secondary piston are arranged in an axially displaceable manner in each case, wherein the primary piston delimits a primary pressure chamber and, when pressure is applied to a pressure medium arranged in the primary pressure chamber, can be moved against the outer disc pack with a pressure force, such that the latter is moved against the inner disc pack in such a way that a torque can be transmitted from the input shaft to the output shaft and vice versa as a result of friction between the outer disc pack and the inner disc pack caused by the pressure force, wherein the secondary piston delimits a secondary pressure chamber and, when pressure is applied to the pressure medium or a pressure medium located in the secondary pressure chamber, can be moved such that it moves the primary piston against the outer disc pack, wherein the primary piston and the secondary piston are connected to one another via a spring element, wherein the secondary piston and the spring element are an integral component.

2. The clutch device according to claim 1, wherein
the spring element is a bellows or a disc spring.

3. The clutch device according to claim 2, wherein the spring element is the bellows,
wherein
the spring element delimits the primary pressure chamber outwards in a radial direction.

4. The clutch device according to claim 1,
wherein
the secondary piston comprises a radial secondary piston section and an axial secondary piston section adjoining it.

5. The clutch device according to claim 4,
wherein
the spring element, is arranged at the end of the axial secondary piston section opposite the radial secondary piston section or forms the axial secondary piston section.

6. The clutch device according to claim 4,
wherein
the axial secondary piston section engages around a support flange extending between the primary piston and the secondary piston and from the retaining element, which delimits the primary pressure chamber, in such a way that the axial secondary piston section slides along the radial end of the support flange.

7. The clutch device according to claim 4,
wherein
the secondary pressure chamber is delimited by a secondary pressure chamber delimiting flange which is stationary with respect to the axially displaceable secondary piston and is fastened to the retaining element, wherein the radial secondary piston section has an axially open annular groove delimiting the secondary pressure chamber, wherein the secondary pressure chamber delimiting flange engages axially in the annular groove and slides in a fluid-tight manner along a surface of the annular groove with a delimiting flange sealing element during the axial displacement of the secondary piston.

8. The clutch device according to claim 1,
wherein
a further spring element is provided, which is supported on the one hand on a section which is stationary with respect to the axially displaceable pistons.

9. A torque distribution device for a motor vehicle, comprising two clutch devices each designed as multiple disc clutches according to claim 1 and a rotor carrier that is or can be coupled to the input shaft, wherein the outer disc pack of each of the clutch devices is arranged in an axially displaceable manner on the rotor carrier in each case, wherein the inner disc pack of each of the clutch devices is arranged in an axially displaceable manner on a separate inner multiple disc carrier in each case, wherein each of the inner multiple disc carriers is or can be coupled to a separate output shaft.

10. A clutch device for a motor vehicle, comprising:
a disc pack comprising:
an outer disc pack arranged to be coupled to an input shaft; and
an inner disc pack arranged to be coupled to an output shaft; and
an actuation device comprising:
a retaining element;
a primary piston arranged on the retaining element in an axially displaceable manner, the primary piston delimiting a primary pressure chamber;
a secondary piston arranged on the retaining element in an axially displaceable manner, the secondary piston delimiting a secondary pressure chamber; and a spring element integrally formed from a same piece of material as the secondary piston, the spring element connecting the primary piston to the secondary piston, wherein:

when a pressure is applied to a pressure medium in the primary pressure chamber, the primary piston is arranged to move the outer disc pack against the inner disc pack and frictionally transmit torque from the input shaft to the output shaft; and when a pressure is applied to a pressure medium in the secondary pressure chamber, the secondary piston is arranged to move the primary piston against the outer disc pack.

11. The clutch device of claim 10, wherein the spring element is a bellows or a disc spring.

12. The clutch device of claim 10, wherein:
the spring element is a bellows; and
the spring element delimits the primary pressure chamber in a radially outward direction.

13. The clutch device of claim 10, wherein the secondary piston comprises:
a radial secondary piston section; and
an axial secondary piston section adjoining the radial secondary piston section.

14. The clutch device of claim 13, wherein:
the spring element is arranged at an end of the axial secondary piston section opposite the radial secondary piston section; or
the spring element forms the axial secondary piston section.

15. The clutch device of claim 13 further comprising a support flange extending from the retaining element between the primary piston and the secondary piston and delimiting the primary pressure chamber, the support flange comprising a support flange sealing element, wherein the axial secondary piston section engages around the support flange and slides along the support flange sealing element in a fluid-tight manner.

16. The clutch device of claim 13 further comprising a secondary pressure chamber delimiting flange fastened to the retaining element, the secondary pressure chamber delimiting flange arranged to delimit the secondary pressure chamber and comprising a delimiting flange sealing element, wherein:

the radial secondary piston section comprises an axially open annular groove delimiting the secondary pressure chamber; and the secondary pressure chamber delimiting flange engages axially in the axially open annular groove and the delimiting flange sealing element slides in a fluid-tight manner along a surface of the axially open annular groove during axial displacement of the secondary piston.

17. The clutch device of claim 10, further comprising a further spring element supported on a stationary support flange and the secondary piston.

* * * * *